US012566468B1

(12) United States Patent
Ning

(10) Patent No.: US 12,566,468 B1
(45) Date of Patent: Mar. 3, 2026

(54) PRESSING ROTATING STRUCTURE

(71) Applicant: Zhengzhou Hezhi Jiacheng Technology Co., Ltd., Zhengzhou (CN)

(72) Inventor: Zhe Ning, Zhengzhou (CN)

(73) Assignee: Zhengzhou Hezhi Jiacheng Technology Co., Ltd., Zhengzhou (CN)

( * ) Notice: Subject to any disclaimer, the term of this patent is extended or adjusted under 35 U.S.C. 154(b) by 0 days.

(21) Appl. No.: 19/248,610

(22) Filed: Jun. 25, 2025

(30) Foreign Application Priority Data

Jun. 6, 2025 (CN) ........................ 202510757374.6

(51) Int. Cl.
*G05G 1/04* (2006.01)
*A46B 13/08* (2006.01)

(52) U.S. Cl.
CPC ............... *G05G 1/04* (2013.01); *A46B 13/08* (2013.01)

(58) Field of Classification Search
CPC ...................................................... A46B 13/08
See application file for complete search history.

(56) References Cited

U.S. PATENT DOCUMENTS 11,103,055 B2 * 8/2021 Richmond ............... A46B 9/10
2007/0199574 A1 * 8/2007 Ragosta ................. A45D 2/002 132/238

FOREIGN PATENT DOCUMENTS

CN 214103611 U 9/2021
CN 217959167 U 12/2022
CN 222194414 U 12/2024

* cited by examiner

*Primary Examiner* — Vicky A Johnson
(74) *Attorney, Agent, or Firm* — Nitin Kaushik

(57) ABSTRACT

The present invention discloses a pressing rotating structure and a brush. In the pressing rotating structure, a key rotatably connected to a housing is disposed, so that the key can swing between a first position and a second position under a pressing force and an elastic force of an elastic member, to drive a center rotating shaft to rotate through a sectorial tooth on the key and a transmission assembly in sequence, thereby implementing manual pressing driving without requiring electricity. The pressing rotating structure has advantages of simple structure, convenient use, low manufacturing costs, and the like.

8 Claims, 7 Drawing Sheets

PRESSING ROTATING STRUCTURE

CROSS-REFERENCE TO RELATED APPLICATIONS

The application claims priority to Chinese patent application No. 2025107573746, filed on Jun. 6, 2025, the entire contents of which are incorporated herein by reference.

TECHNICAL FIELD

The present invention relates to the technical field of rotary drive devices, and in particular, to a pressing rotating structure and a brush.

BACKGROUND

Most of the existing rotary drive devices are electrically driven, for example, electric cleaning brushes, electric egg beaters, and the like. Although the electrically driven rotation is more time-saving and labor-saving, there is a risk of electric leakage, which may affect the normal use of the rotary drive devices and may threaten personal safety especially when stirring conductive liquid. In addition, electrically driven rotary drive devices require electric energy, which cannot be used for a long time in an environment without power supply and have poor convenience of use.

SUMMARY

In view of the above problems, the present invention discloses a pressing rotating structure and a brush, to overcome the above problems or at least partially solve the above problems.

To achieve the foregoing purpose, the present invention adopts the following technical solution:

According to a first aspect, the present invention discloses a pressing rotating structure, including a rotating shaft assembly, a transmission assembly, a pressing assembly, and a housing, where the rotating shaft assembly includes a center rotating shaft, and a lower portion of the center rotating shaft is inserted into the housing from a through hole at an upper end of the housing; the pressing assembly includes a key and an elastic member, the key is at least partially located in an opening on a side portion of the housing, and one end of the key is rotatably connected to the housing, so that the key can swing between a first position and a second position; a sectorial tooth is formed on the key, and the sectorial tooth drives the center rotating shaft to rotate through the transmission assembly; and the elastic member is disposed between the housing and the key, and the elastic member is provided with a compression preload force enabling the key to be maintained at the first position; and when the key is located at the first position, a pressing portion on the key extends out from the opening, and one end, away from the opening, of the sectorial tooth is engaged with a rotating gear in the transmission assembly; and when the key is located at the second position, the pressing portion on the key enters the opening, and one end, close to the opening, of the sectorial tooth is engaged with the rotating gear in the transmission assembly.

Further, the transmission assembly further includes an end face fluted disc and a bevel gear; and the bevel gear is fixedly sleeved at a lower end of the center rotating shaft and is engaged with the end face fluted disc, the end face fluted disc and the rotating gear are coaxially and rotatably sleeved on a first rotating shaft, the first rotating shaft is fixedly connected to the housing, and the end face fluted disc is in transmission connection with the rotating gear.

Further, an anti-reverse rotation assembly is further included; and the anti-reverse rotation assembly includes a rotating disk and a plurality of driving pawls, the rotating disk and the rotating gear are coaxially disposed and are fixedly connected, the driving pawls are centrosymmetrically arranged on a periphery of the rotating disk, the driving pawls are rotatably connected to the rotating disk through a pin respectively, a central position of the end face fluted disc is provided with a circular groove, the rotating disk and the driving pawls are located in the circular groove, and a ratchet matched with the driving pawls is formed on an annular groove wall of the circular groove.

Further, the anti-reverse rotation assembly further includes a plurality of connecting bands; and the connecting bands are connected between tips of two adjacent driving pawls respectively.

Further, an accommodating groove is formed on a side end face of one side, away from the opening, of the key, and a flexible member is disposed in the accommodating groove.

Further, a lower portion of one side, away from the opening, of the key is provided with a limiting convex block, and the limiting convex block can be matched with the housing below the opening in a limiting manner, to be configured to prevent the key from being completely disengaged from the opening.

Further, when the key is at the second position, the pressing portion of the key is flush with the housing at a position at which the opening is located.

Further, the rotating shaft assembly further includes a first bearing and a second bearing; and an inner ring of the first bearing is sleeved on the lower portion of the center rotating shaft, an outer ring of the first bearing is fixedly connected to the housing, an inner ring of the second bearing is fixedly sleeved on a middle portion of the center rotating shaft, and an outer ring of the second bearing is fixedly connected to the housing.

Further, the elastic member is a torsion spring, one end of the torsion spring abuts against the key, the other end of the torsion spring abuts against the housing, a second rotating shaft is disposed in the housing above the opening, the second rotating shaft is fixedly connected to the housing, an upper end of the key and the torsion spring are rotatably sleeved on the second rotating shaft, and a sliding sleeve is disposed between the second rotating shaft and the torsion spring.

According to another aspect, the present invention discloses a brush, including a brush head and the above pressing rotating structure, where the brush head is fixed to an upper portion of the center rotating shaft.

The present invention has the following advantages and beneficial effects:

In the pressing rotating structure of the present invention, the key rotatably connected to the housing is disposed, so that the key can swing between the first position and the second position under a pressing force and an elastic force of the elastic member, to drive the center rotating shaft to rotate through the sectorial tooth on the key and the transmission assembly in sequence, thereby implementing manual pressing driving without requiring electricity. Therefore, a risk of electric leakage is avoided, and the pressing rotating structure can be used for a long time in an environment without power supply. The pressing rotating structure has advantages of simple structure, convenient use, low manufacturing costs, and the like.

BRIEF DESCRIPTION OF THE DRAWINGS

Various other advantages and benefits will become apparent to those of ordinary skill in the art upon reading the following detailed description of the preferred embodiments. The accompanying drawings are only for the purpose of illustrating the preferred implementations and are not considered as limiting the present invention. Throughout the accompanying drawings, the same reference numerals represent the same components. In the drawings.

In the figures: 1. housing; 1-1. front housing; 1-2. rear housing; 2. center rotating shaft; 3. key; 4. sectorial tooth; 5. rotating gear; 6. end face fluted disc; 7. bevel gear; 8. first rotating shaft; 9. rotating disk; 10. driving pawl; 11. circular groove; 12. ratchet; 13. connecting band; 14. flexible member; 15. limiting convex block; 16. first bearing; 17. second bearing; 18. second rotating shaft; 19. pressing portion.

DETAILED DESCRIPTION OF THE EMBODIMENTS

To make the purpose, technical solutions, and advantages of the present invention clearer, the following clearly and completely describes the technical solutions of the present invention with reference to the specific embodiments of the present invention and corresponding accompanying drawings. Apparently, the embodiments described are only a part rather than all of the embodiments of the present invention. Based on the embodiments in the present invention, all other embodiments obtained by those of ordinary skill in the art without making creative efforts shall fall within the protection scope of the present invention.

Figure 1:
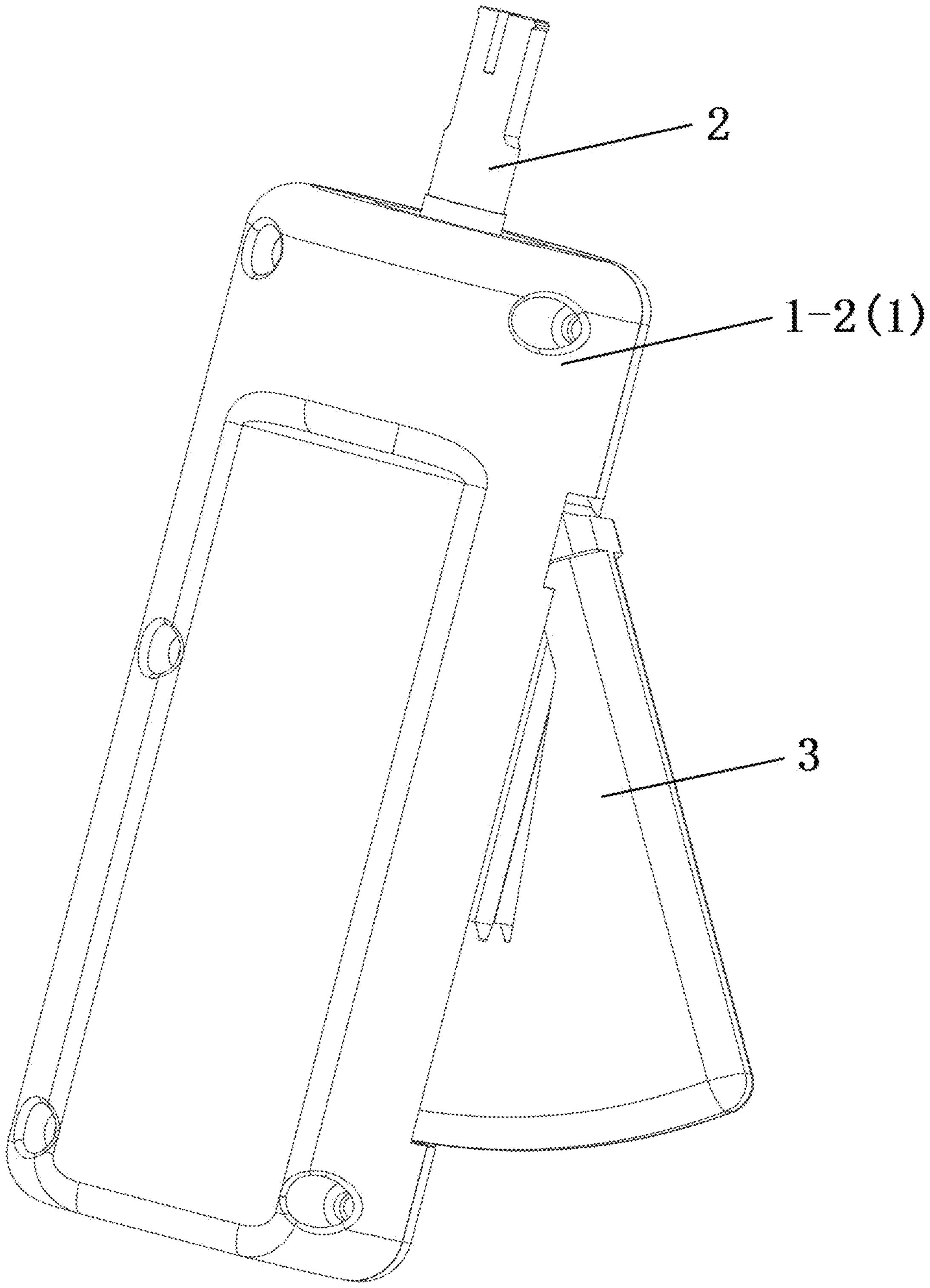
FIG. 1 is a three-dimensional structural diagram of a pressing rotating structure when a key is located at a first position according to an embodiment of the present invention.

For ease of understanding and description of the technical solutions of the present application, the top of FIG. 1 is defined as "up", the bottom of FIG. 1 is defined as "down", the inner side of FIG. 1 is defined as "front", and the outer side of FIG. 1 is defined as "rear".

The technical solutions provided in the embodiments of the present invention are described in detail below with reference to the accompanying drawings.

According to an embodiment of the present invention, a pressing rotating structure is provided. The pressing rotating structure includes a rotating shaft assembly, a transmission assembly, a pressing assembly, and a housing 1. An accommodating hollow cavity is formed in the housing 1.

Specifically, as shown in FIG. 1 to FIG. 4, the rotating shaft assembly includes a center rotating shaft 2, and an upper portion of the center rotating shaft 2 is configured to be connected to a rotating head, for example, a brush head or a stirring head, to adapt to different application scenarios. An upper end of the housing 1 is provided with a through hole, and a lower portion of the center rotating shaft 2 is inserted into the housing 1 from the through hole. The pressing assembly includes a key 3 and an elastic member, a side portion of the housing 1 is provided with an opening, the key 3 is at least partially located in the opening, and one end of the key 3 is rotatably connected to the housing 1, so that the key 3 can swing between a first position and a second position. As shown in FIG. 5, a sectorial tooth 4 and a pressing portion 19 are formed on the key 3, and the pressing portion 19 is configured to provide a pressing position for a hand. During swinging of the key 3, the sectorial tooth 4 drives the center rotating shaft 2 to rotate through the transmission assembly, to manually drive the center rotating shaft 2. The elastic member is disposed between the housing 1 and the key 3, and the elastic member is provided with a compression preload force enabling the key 3 to be maintained at the first position.

When the key 3 is located at the first position (referring to a position at which the key 3 is located in FIG. 1 and FIG. 2), the pressing portion 19 on the key 3 extends out from the opening, and one end, away from the opening, of the sectorial tooth 4 is engaged with a rotating gear 5 in the transmission assembly. When the key 3 is located at the second position (referring to a position at which the key 3 is located in FIG. 3 and FIG. 4), the pressing portion 19 on the key 3 enters the opening, and one end, close to the opening, of the sectorial tooth 4 is engaged with the rotating gear 5 in the transmission assembly.

A working process of the pressing rotating structure is as follows:

When the hand presses the key 3, the key 3 overcomes an elastic force of the elastic member and swings from the first position to the second position. When the hand does not press the key 3, due to the elastic force of the elastic member, the key 3 swings from the second position to the first position. Since the sectorial tooth 4 is engaged with the rotating gear 5, during swinging of the key 3, the key 3 drives the rotating gear 5 to rotate through the sectorial tooth 4, to provide a driving force for the transmission assembly, so that the transmission assembly drives the center rotating shaft 2 to rotate, thereby driving the rotating head connected to the upper portion of the center rotating shaft 2. In this way, the center rotating shaft 2 can be driven to rotate by pressing the key 3 without requiring electricity, so that use is more convenient. In addition, a rotating speed of the center rotating shaft 2 may be controlled in real time by changing a frequency and force of pressing the key 3, to control a rotating speed of the rotating head, thereby avoiding liquid splashing caused by an excessive rotating speed of the rotating head.

In conclusion, in the pressing rotating structure of the embodiment, the key rotatably connected to the housing is disposed, so that the key can swing between the first position and the second position under a pressing force and the elastic force of the elastic member, to drive the center rotating shaft to rotate through the sectorial tooth on the key and the transmission assembly in sequence, thereby implementing manual pressing driving without requiring electricity. Therefore, a risk of electric leakage is avoided, and the pressing rotating structure can be used for a long time in an environment without power supply. The pressing rotating structure has advantages of simple structure, convenient use, low manufacturing costs, and the like.

Figure 2:
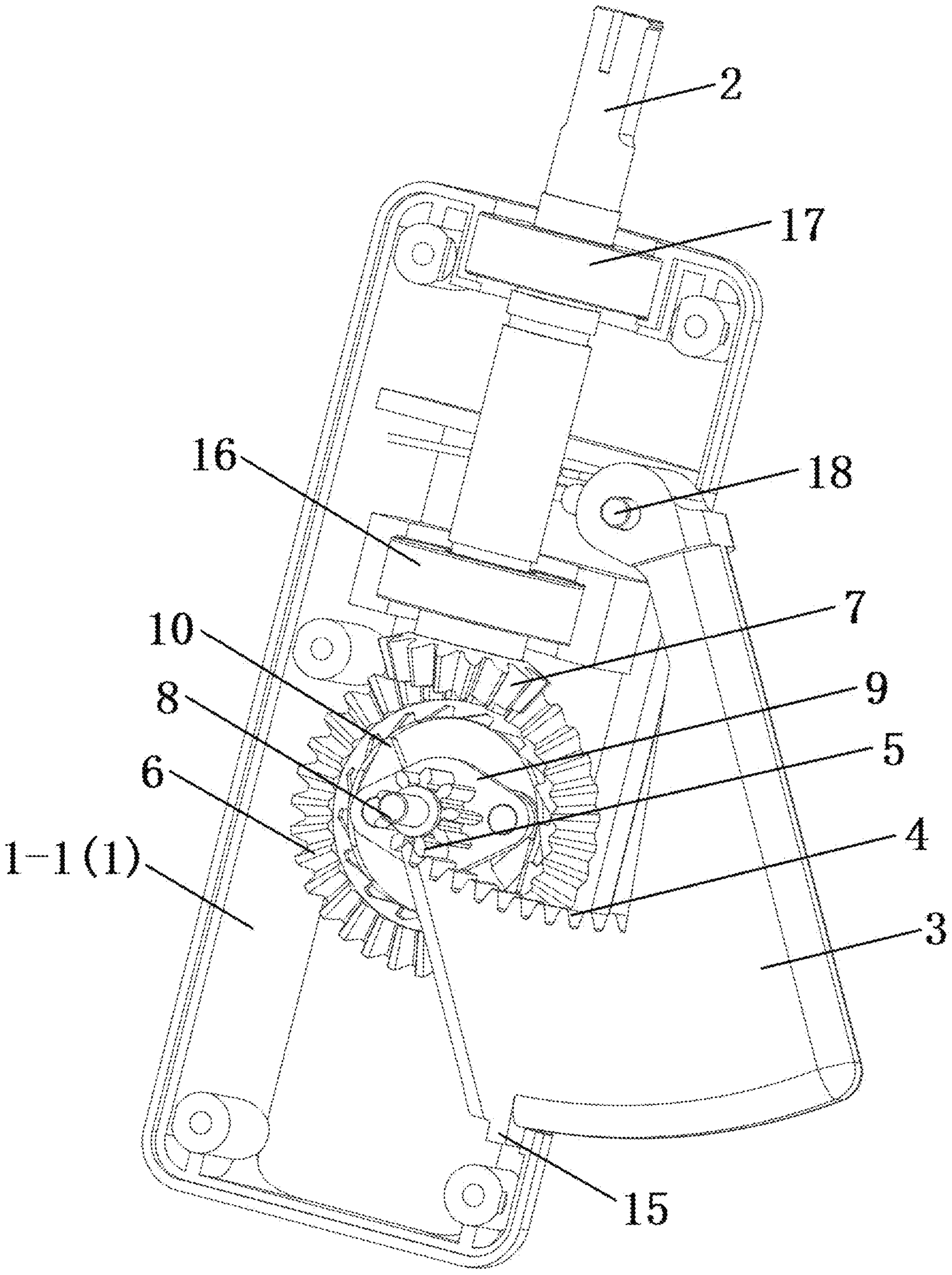
FIG. 2 is an internal structural diagram of a pressing rotating structure when a key is located at a first position according to an embodiment of the present invention.
Figure 4:
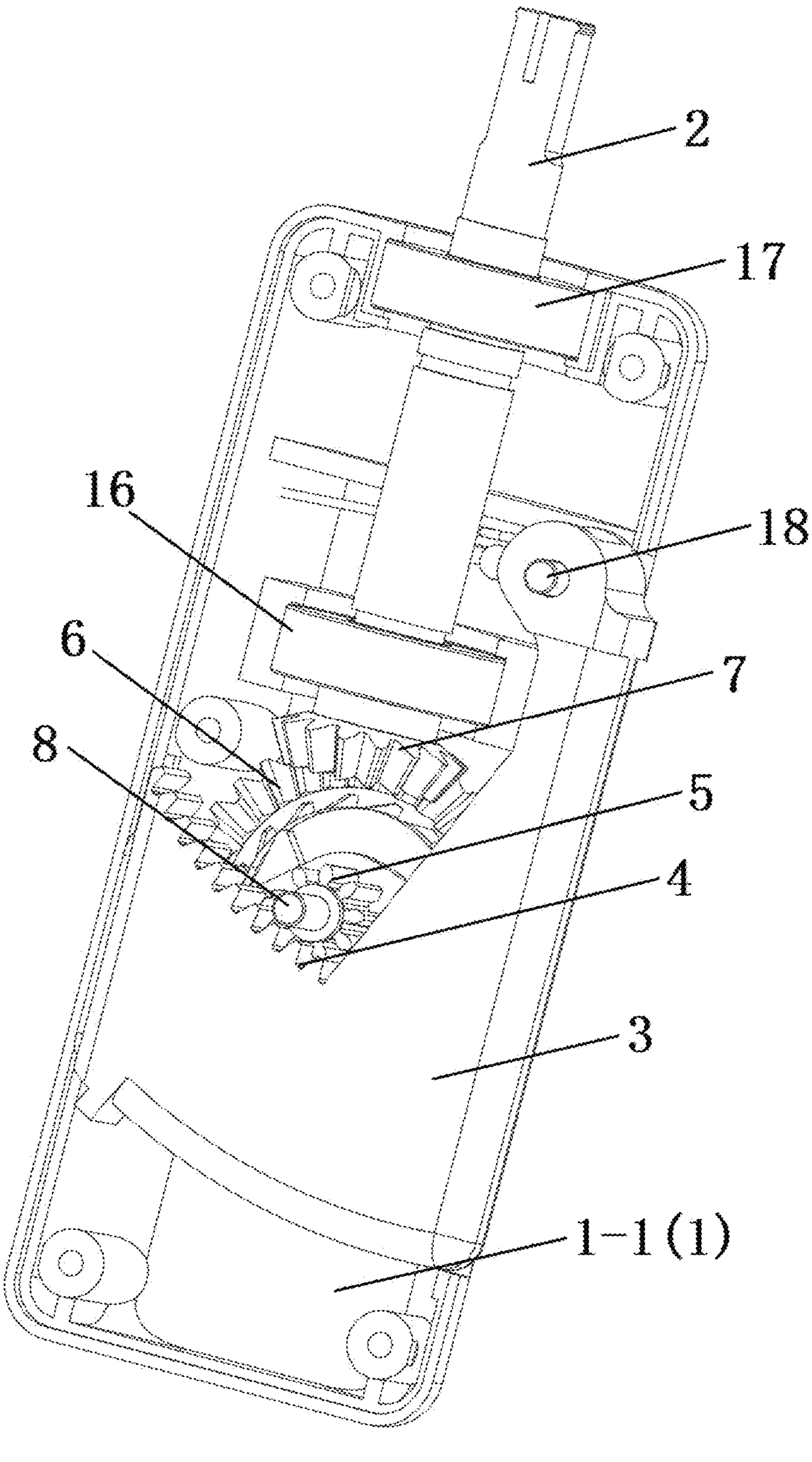
FIG. 4 is an internal structural diagram of a pressing rotating structure when a key is located at a second position according to an embodiment of the present invention.
Figure 5:
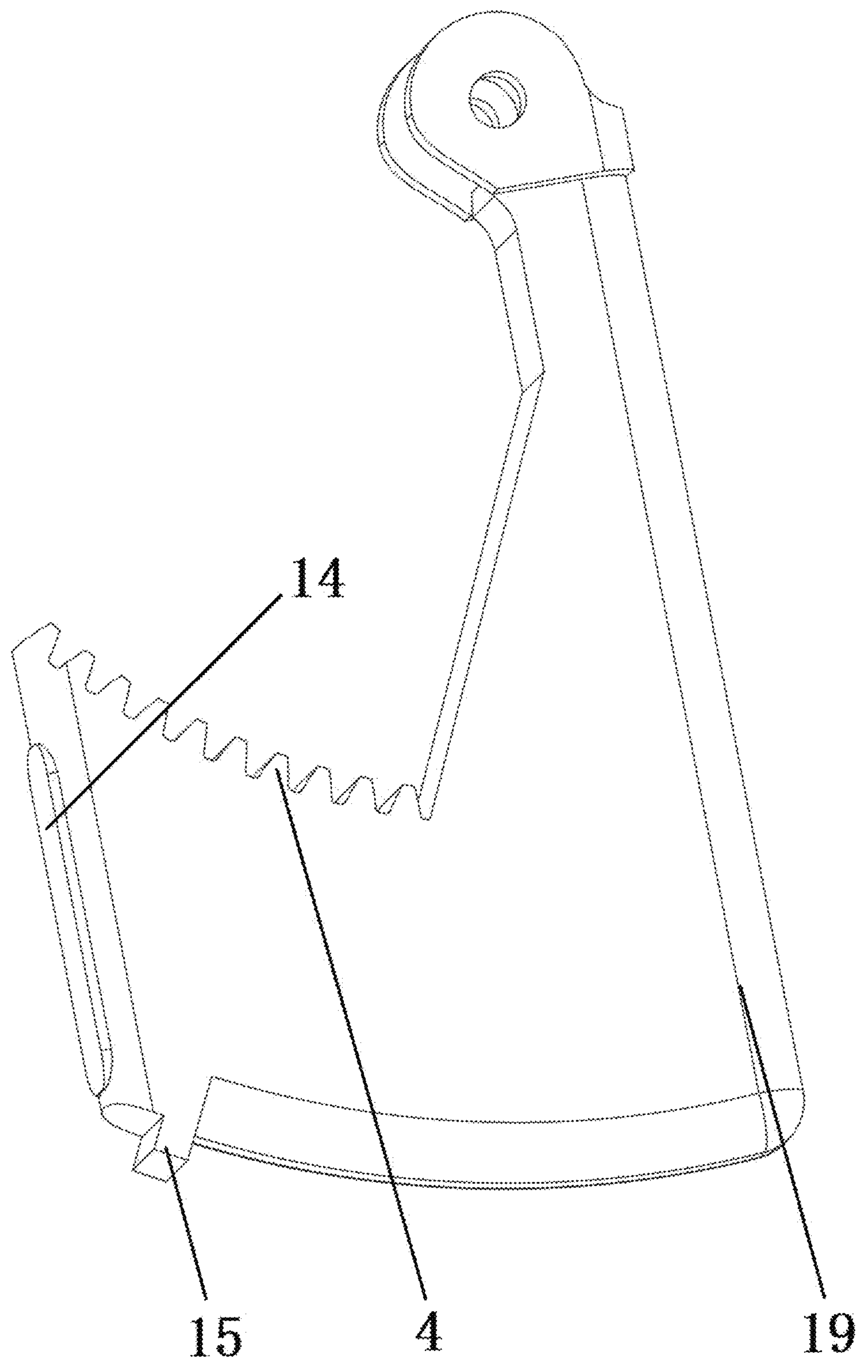
FIG. 5 is a three-dimensional structural diagram of a key according to an embodiment of the present invention.

In the embodiment, as shown in FIG. 2 and FIG. 4, the transmission assembly further includes an end face fluted disc 6 and a bevel gear 7 that are disposed in the housing 1.

The bevel gear 7 is fixedly sleeved at a lower end of the center rotating shaft 2 and is engaged with an end face tooth on the end face fluted disc 6. The end face fluted disc 6 and the rotating gear 5 are coaxially and rotatably sleeved on a first rotating shaft 8, the first rotating shaft 8 is fixedly connected to the housing 1, and the end face fluted disc 6 is in transmission connection with the rotating gear 5. A structure of the transmission assembly enables the pressing rotating structure to have a high transmission ratio and high transmission efficiency. When the rotating head is the brush head, a formed brush can completely cover a cleaning task of a general container.

In addition, the pressing rotating structure further includes an anti-reverse rotation assembly, and the anti-reverse rotation assembly is configured to enable the center rotating shaft to rotate toward one direction only.

As shown in FIG. 2, FIG. 4, FIG. 6, and FIG. 7, the anti-reverse rotation assembly includes a rotating disk 9 and a plurality of driving pawls 10. The rotating disk 9 and the rotating gear 5 are coaxially disposed and are fixedly connected, the driving pawls 10 are centrosymmetrically arranged on a periphery of the rotating disk 9, the driving pawls 10 are rotatably connected to the rotating disk 9 through a pin respectively, and tips of the driving pawls 10 face a clockwise direction. A central position of the end face fluted disc 6 is provided with a circular groove 11, and the rotating disk 9 and the driving pawls 10 are located in the circular groove 11. A ratchet 12 matched with the driving pawls 10 is formed on an annular groove wall of the circular groove 11, and tips of the ratchet 12 face an anticlockwise direction.

When the key 3 is pressed, the key 3 swings from the first position to the second position, and the sectorial tooth 4 drives the rotating gear 5 to rotate clockwise and drives the rotating disk 9 to rotate at the same time. Due to a centrifugal force, the tips of the driving pawls 10 rotate toward the ratchet 12 and are inserted into the ratchet 12, so that transmission between the rotating disk 9 and the end face fluted disc 6 is formed to drive the end face fluted disc 6 to rotate clockwise, thereby driving the center rotating shaft 2 to rotate toward one direction. When the key 3 is not pressed, the key 3 swings from the second position to the first position, and the sectorial tooth 4 drives the rotating gear 5 to rotate anticlockwise and drives the rotating disk 9 to rotate at the same time. Since the tips of the ratchet 12 are inclined, the tips of the driving pawls 10 cannot be inserted into the ratchet 12, so that the transmission between the rotating disk 9 and the end face fluted disc 6 cannot be formed. At this time, the rotating disk 9 idles, and the center rotating shaft 2 does not rotate. Since the anti-reverse rotation assembly is disposed, on the one hand, the center rotating shaft 2 can be ensured to rotate toward one direction, thereby meeting a rotation requirement; and on the other hand, the elastic member only needs to provide a reset force for the key 3 to swing from the second position to the first position, thereby reducing a burden of the elastic member.

Figure 6:
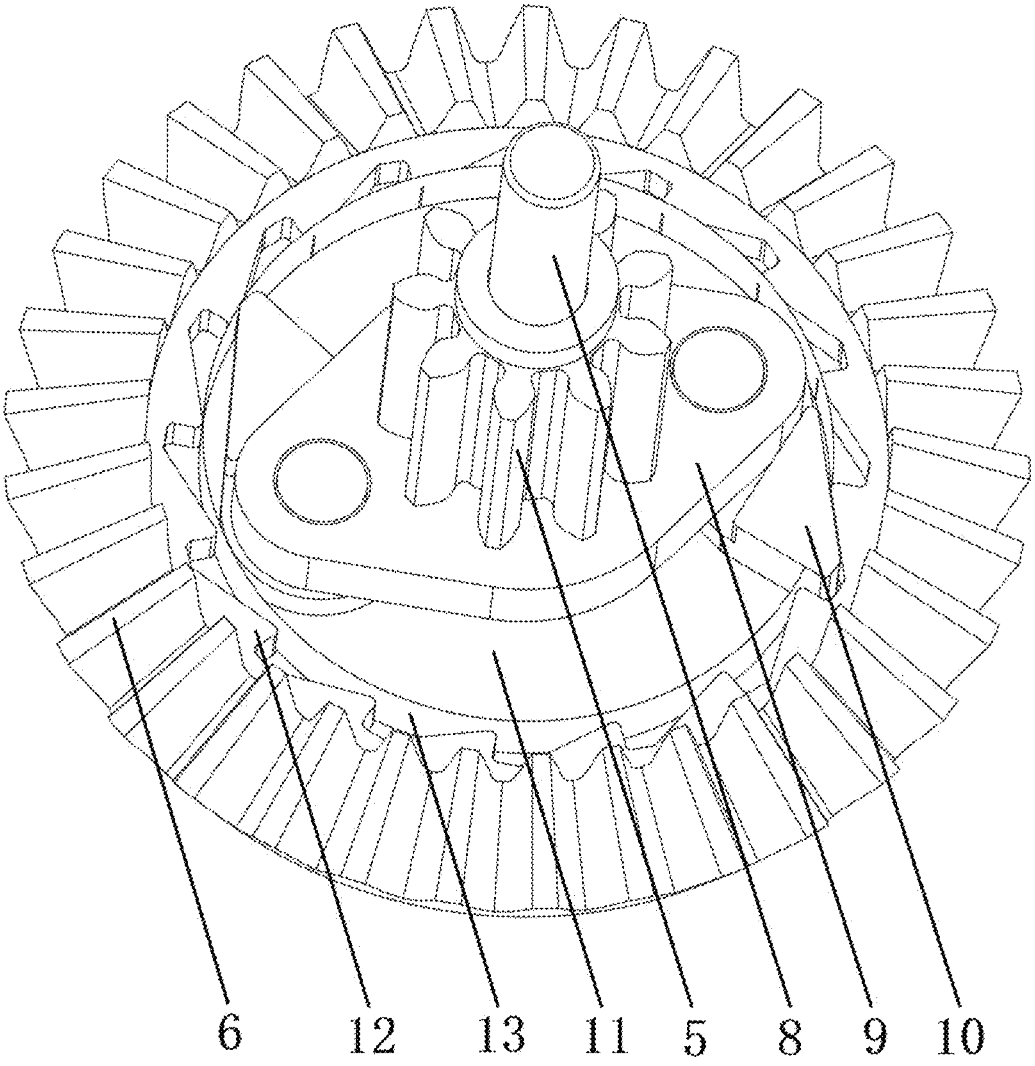
FIG. 6 is a three-dimensional structural diagram of an anti-reverse rotation assembly according to an embodiment of the present invention.
Figure 7:
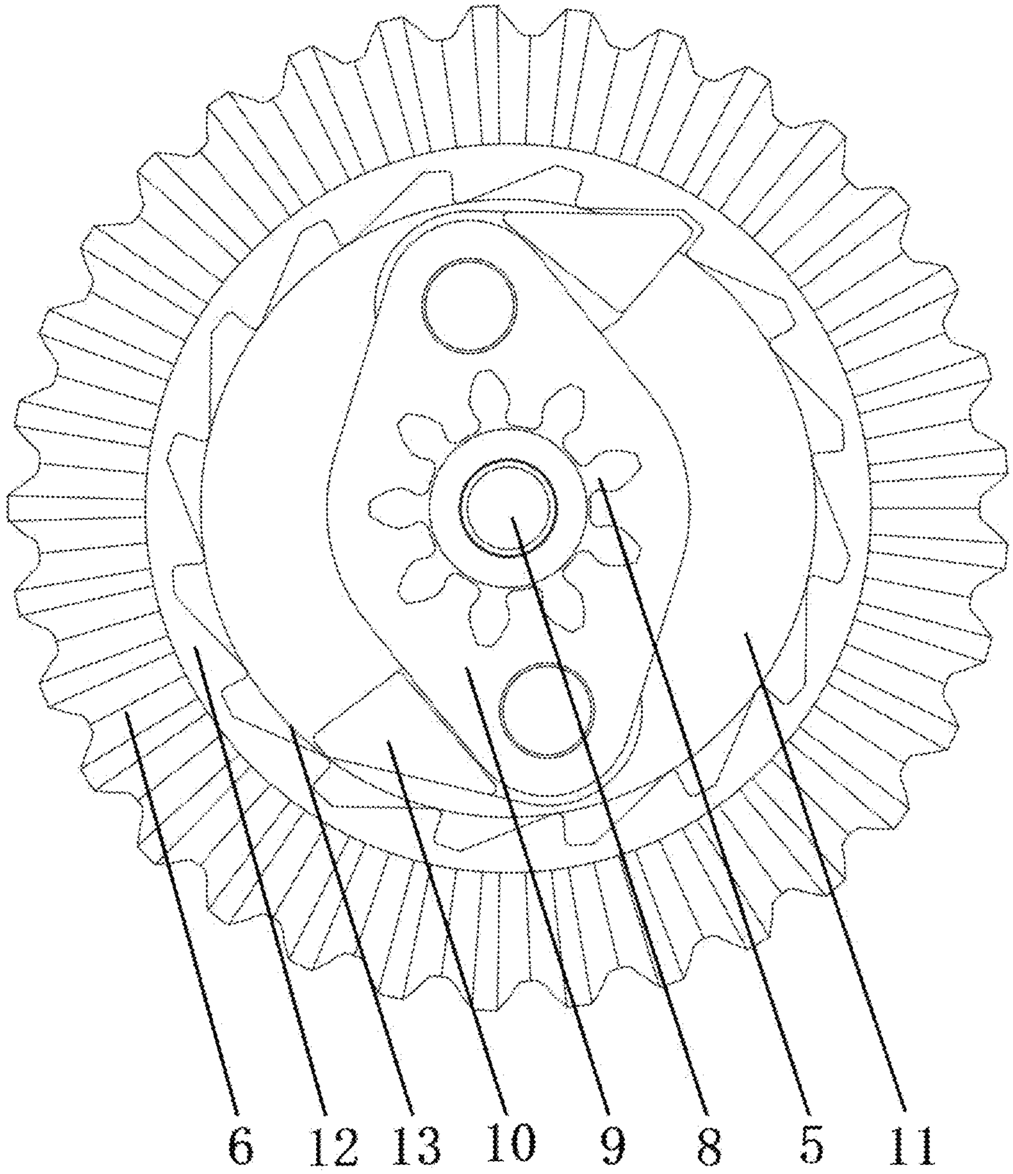
FIG. 7 is a top view of an anti-reverse rotation assembly according to an embodiment of the present invention.

Further, as shown in FIG. 6 and FIG. 7, the anti-reverse rotation assembly further includes a plurality of connecting bands 13. A quantity of the connecting bands 13 is consistent with that of the driving pawls 10, and the connecting bands 13 may be made of metal or plastic.

The connecting bands 13 are connected between tips of two adjacent driving pawls 10 respectively, to ensure that the tips of the driving pawls 10 are located at synchronous positions, thereby ensuring that the tips of the driving pawls 10 can be synchronously inserted into the ratchet 12 or synchronously separated from the ratchet 12.

Certainly, in another embodiment, a spring may be disposed between the driving pawls and the rotating disk, to ensure that the tips of the driving pawls rotate toward the ratchet.

In the embodiment, as shown in FIG. 5, an accommodating groove is formed on a side end face of one side, away from the opening, of the key 3, and a flexible member 14 is disposed in the accommodating groove. In this way, when the key 3 swings from the first position to the second position, one side, away from the opening, of the key 3 collides with the interior of the housing 1, and the flexible member 14 is disposed to play a role in buffering the collision, to prevent the generation of noise and vibration. The flexible member may be a rubber block or a silicone block.

In addition, as shown in FIG. 2 and FIG. 5, a lower portion of one side, away from the opening, of the key 3 is provided with a limiting convex block 15. The limiting convex block 15 can be matched with the housing 1 below the opening in a limiting manner, that is, it is ensured that the limiting convex block 15 is always located in the housing 1, so that the key 3 can be prevented from being completely disengaged from the opening, and the key 3 can swing furthest to the first position.

Figure 3:
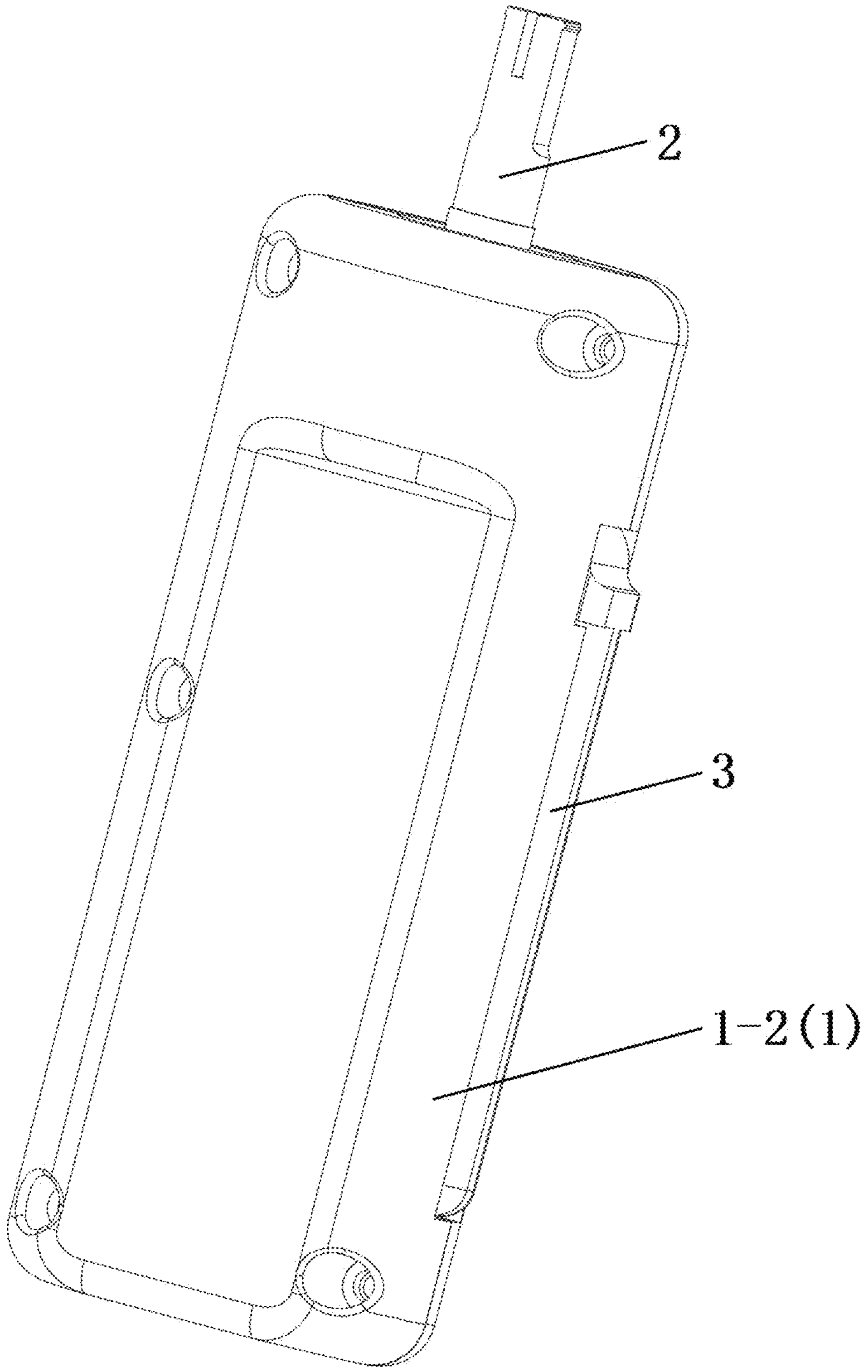
FIG. 3 is a three-dimensional structural diagram of a pressing rotating structure when a key is located at a second position according to an embodiment of the present invention.

In addition, as shown in FIG. 3 and FIG. 4, when the key 3 is at the second position, the pressing portion 19 of the key 3 is flush with the housing 1 at a position at which the opening is located. In this way, when the key 3 is pressed to enable the key 3 to swing to the second position, the pressing force applied by the hand is shared by the housing 1 and the key 3, to prevent the key 3 from being still subjected to a large pressing force at the second position.

In the embodiment, as shown in FIG. 2 and FIG. 4, the rotating shaft assembly further includes a first bearing 16 and a second bearing 17.

An inner ring of the first bearing 16 is sleeved on the lower portion of the center rotating shaft 2, and an outer ring of the first bearing 16 is fixedly connected to the housing 1. An inner ring of the second bearing 17 is fixedly sleeved on a middle portion of the center rotating shaft 2, and an outer ring of the second bearing 17 is fixedly connected to the housing 1. The first bearing 16 and the second bearing 17 support the center rotating shaft 2, so that the center rotating shaft 2 rotates more stably.

In addition, the elastic member is a torsion spring. One end of the torsion spring abuts against the key, and the other end of the torsion spring abuts against the housing. As shown in FIG. 2 and FIG. 4, a second rotating shaft 18 is disposed in the housing 1 above the opening. The second rotating shaft 18 is fixedly connected to the housing 1, and an upper end of the key 3 and the torsion spring are rotatably sleeved on the second rotating shaft 18. A sliding sleeve is disposed between the second rotating shaft 18 and the torsion spring, and the sliding sleeve may be made of a material such as metal and polytetrafluoroethylene having wear resistance and lubricity, to be configured to reduce friction generated between the torsion spring and the second rotating shaft 18.

When the hand holds the housing 1, and a finger presses the key 3, only metacarpophalangeal joints perform mechanical motion, thereby avoiding collaborative movement of a plurality of joints of the handle during traditional brushing and cleaning work, which not only saves effort but also improves efficiency.

In addition, as shown in FIG. 1 to FIG. 4, the housing 1 is formed by a front housing 1-1 and a rear housing 1-2, and the front housing 1-1 and the rear housing 1-2 are connected and fixed through a screw or a bolt. A sealing member is disposed between the center rotating shaft 2 and the through hole, and the sealing member can prevent liquid from entering the housing 1 through the through hole.

In another embodiment, the present invention discloses a brush. The brush includes a brush head and the pressing rotating structure in the above embodiment, where the brush head is fixed to an upper portion of the center rotating shaft. The brush can clean daily drinkware, kitchen utensils, and experimental/industrial containers, including but not limited to containers such as cups, bottles, pots, small household appliances, experimental vessels, and industrial pipelines, and compared with traditional cleaning brushes, the brush in the embodiment has higher cleaning efficiency.

The above descriptions are only specific embodiments of the present invention, and under the foregoing teaching of the present invention, a person skilled in the art may make other improvements or variations based on the foregoing embodiments. A person skilled in the art should be aware that the specific description is only for better explaining the purpose of the present invention, and the scope of protection of the present invention shall be subject to the scope of protection of the claims.

What is claimed is:

1. A pressing rotating structure, comprising a rotating shaft assembly, a transmission assembly, a pressing assembly, and a housing, wherein the rotating shaft assembly comprises a center rotating shaft, and a lower portion of the center rotating shaft is inserted into the housing from a through hole at an upper end of the housing; the pressing assembly comprises a key and an elastic member, the key is at least partially located in an opening on a side portion of the housing, and one end of the key is rotatably connected to the housing, so that the key can swing between a first position and a second position; a sectorial tooth is formed on the key, and the sectorial tooth drives the center rotating shaft to rotate through the transmission assembly; and the elastic member is disposed between the housing and the key, and the elastic member is provided with a compression preload force enabling the key to be maintained at the first position; and when the key is located at the first position, a pressing portion on the key extends out from the opening, and one end, away from the opening, of the sectorial tooth is engaged with a rotating gear in the transmission assembly; and when the key is located at the second position, the pressing portion on the key enters the opening, and one end, close to the opening, of the sectorial tooth is engaged with the rotating gear in the transmission assembly;

wherein the transmission assembly further comprises an end face fluted disc and a bevel gear; and the bevel gear is fixedly sleeved at a lower end of the center rotating shaft and is engaged with the end face fluted disc, the end face fluted disc and the rotating gear are coaxially and rotatably sleeved on a first rotating shaft, the first rotating shaft is fixedly connected to the housing, and the end face fluted disc is in transmission connection with the rotating gear.

2. The pressing rotating structure according to claim 1, further comprising an anti-reverse rotation assembly, wherein the anti-reverse rotation assembly comprises a rotating disk and a plurality of driving pawls, the rotating disk and the rotating gear are coaxially disposed and are fixedly connected, the driving pawls are centrosymmetrically arranged on a periphery of the rotating disk, the driving pawls are rotatably connected to the rotating disk through a pin respectively, a central position of the end face fluted disc is provided with a circular groove, the rotating disk and the driving pawls are located in the circular groove, and a ratchet matched with the driving pawls is formed on an annular groove wall of the circular groove.

3. The pressing rotating structure according to claim 2, wherein the anti-reverse rotation assembly further comprises a plurality of connecting bands; and the connecting bands are connected between tips of two adjacent driving pawls respectively.

4. The pressing rotating structure according to claim 1, wherein an accommodating groove is formed on a side end face of one side, away from the opening, of the key, and a flexible member is disposed in the accommodating groove.

5. The pressing rotating structure according to claim 1, wherein a lower portion of one side, away from the opening, of the key is provided with a limiting convex block, and the limiting convex block can be matched with the housing below the opening in a limiting manner, to be configured to prevent the key from being completely disengaged from the opening.

6. The pressing rotating structure according to claim 1, wherein when the key is at the second position, the pressing portion of the key is flush with the housing at a position at which the opening is located.

7. The pressing rotating structure according to claim 1, wherein the rotating shaft assembly further comprises a first bearing and a second bearing; and an inner ring of the first bearing is sleeved on the lower portion of the center rotating shaft, an outer ring of the first bearing is fixedly connected to the housing, an inner ring of the second bearing is fixedly sleeved on a middle portion of the center rotating shaft, and an outer ring of the second bearing is fixedly connected to the housing.

8. The pressing rotating structure according to claim 1, wherein the elastic member is a torsion spring, one end of the torsion spring abuts against the key, the other end of the torsion spring abuts against the housing, a second rotating shaft is disposed in the housing above the opening, the second rotating shaft is fixedly connected to the housing, an upper end of the key and the torsion spring are rotatably sleeved on the second rotating shaft, and a sliding sleeve is disposed between the second rotating shaft and the torsion spring.

* * * * *